Figure 1:
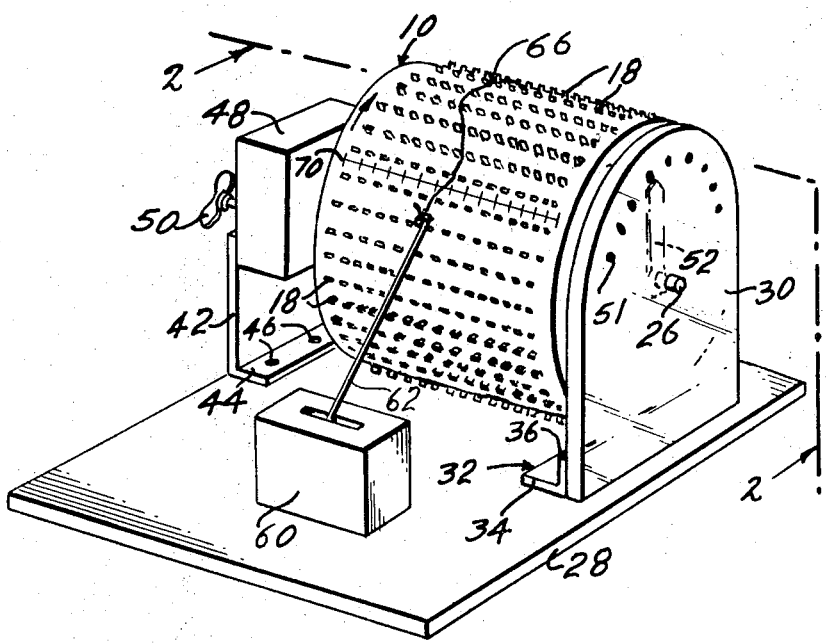

United States Patent

[11] 3,588,907

| [72] | Inventor | Robert T. Luger<br>855 Central Building, Seattle, Wash. 98104 |
| --- | --- | --- |
| [21] | Appl. No. | 779,902 |
| [22] | Filed | Nov. 29, 1968 |
| [45] | Patented | June 28, 1971 |

[54] SELF-ERASING, SHORT-TIME MEMORY DATA RECORDER
11 Claims, 5 Drawing Figs.

[52] U.S. Cl. .................................................... 346/1,
346/21, 116/130
[51] Int. Cl. ...................................................... G01d 9/12
[50] Field of Search .......................................... 346/21, 1;
35/61, 24.4; 116/135, 130, 136

[56] References Cited
UNITED STATES PATENTS

| 1,536,040 | 4/1925 | Mergier et al. | 116/130 |
| 2,412,238 | 12/1946 | Wassell | 116/135 |
| 813,933 | 2/1906 | Abraham | 346/21 |
| 897,715 | 9/1908 | Cowey | 346/21 |
| 1,824,179 | 9/1931 | Tisdale | 346/21 |

Primary Examiner—Joseph W. Hartary
Attorney—Thomas W. Secrest

ABSTRACT: This invention is for a recorder which indicates for a relatively short period of time a physical state such as atmospheric pressure, temperature, and relative humidity. There is a moving exterior surface having outwardly directed protrusions or guides to position a flexible strand. This flexible strand is the indicator for the temperature, the atmospheric pressure and the relative humidity. Relative motion between the exterior surface and the strand is prevented by these protrusions or guides. This relative motion is prevented in directions normal to the strand, whereas motion is affected between the exterior surface and the strand in the direction along the strand at every point of contact of the surface and the strand. The recorder is self-erasing so that an observer does not have to replenish ink, recording paper and the like. For relatively short periods of time, say twelve to twenty-four hours, it is possible to note the variation in the physical state undergoing measurement and recording.

The self-erasing feature is achieved by the strand and the exterior surface separating from each other after a certain period of time and a certain relative movement between the exterior surface and the strand.

PATENTED JUN28 1971

3,588,907

SHEET 1 OF 2

INVENTOR.
Robert T. Luger
BY
TW Secrest

PATENTED JUN28 1971

3,588,907

SHEET 2 OF 2

INVENTOR.
Robert T. Luger
BY
TW Secrest

SELF-ERASING, SHORT-TIME MEMORY DATA RECORDER

Many persons desire to know the variation in certain physical states, such as the temperature, the atmospheric pressure, and the relative humidity, to name a few. These persons do not want to have to replenish an ink supply or to put a new blank chart on a recorder. The day-to-day functions of replenishing an ink supply or putting a new chart on the recorder deter these persons from following changes in temperature, atmospheric pressure, and relative humidity. With this background, I have invented this recorder which records for a short period of time, say 12 to 24 hours, the surrounding temperature or the atmospheric pressure or the relative humidity. Further, this recorder is self-erasing so that after the elapsed time period for recording the physical state undergoing measurement, the recorder erases the reading to present a fresh surface for recording purposes. Accordingly, one of the objects and advantages of this invention is to provide a recorder which has a readily visible short-time record of a physical state; to provide a recorder which does not require manual operation for the changing of recording paper, tapes, graph paper, markers, such as ink, pencil, and which recorder can operate without the attention of an operator; to provide a recorder which records fluctuations in a variable quantity where the precise nature of the fluctuation is a salient factor; to provide a recorder of relatively simple construction; to provide a recorder which erases the record after the record has served its useful purpose; and to provide and inexpensive recorder having a low cost to manufacture.

These and other important objects and advantages of the invention will be more particularly brought forth upon reference to the appended drawings, the detailed specification of the invention and the accompanying claims.

Figure 3:
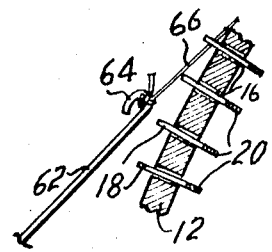
Figure 2:
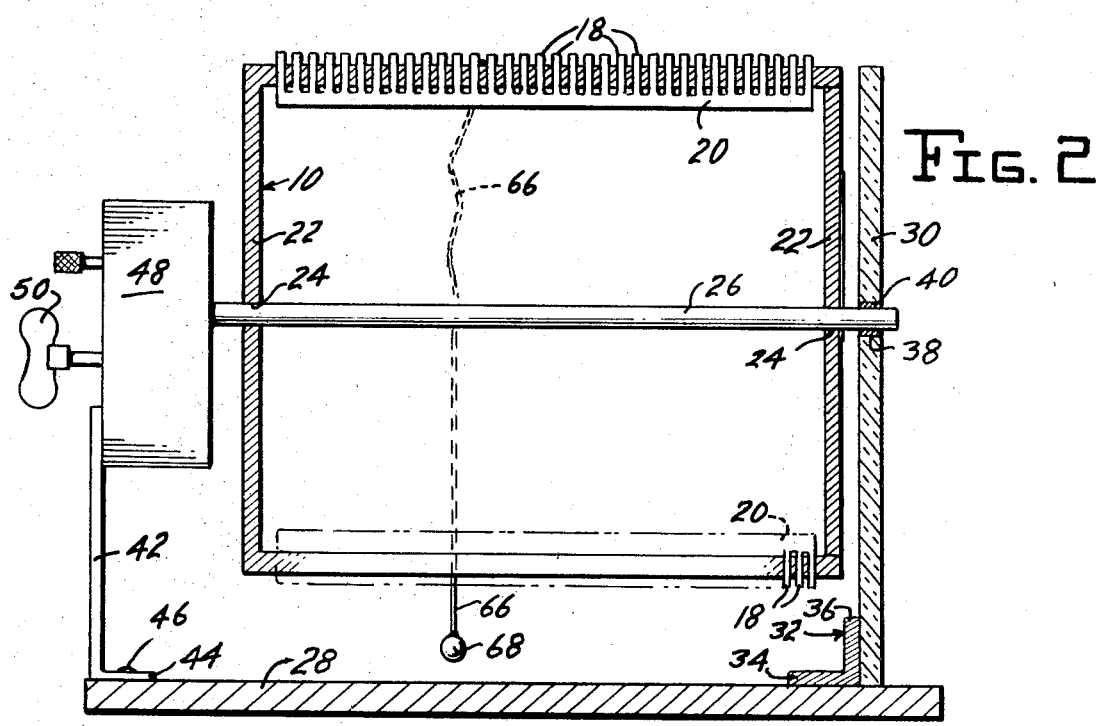
Figure 4:
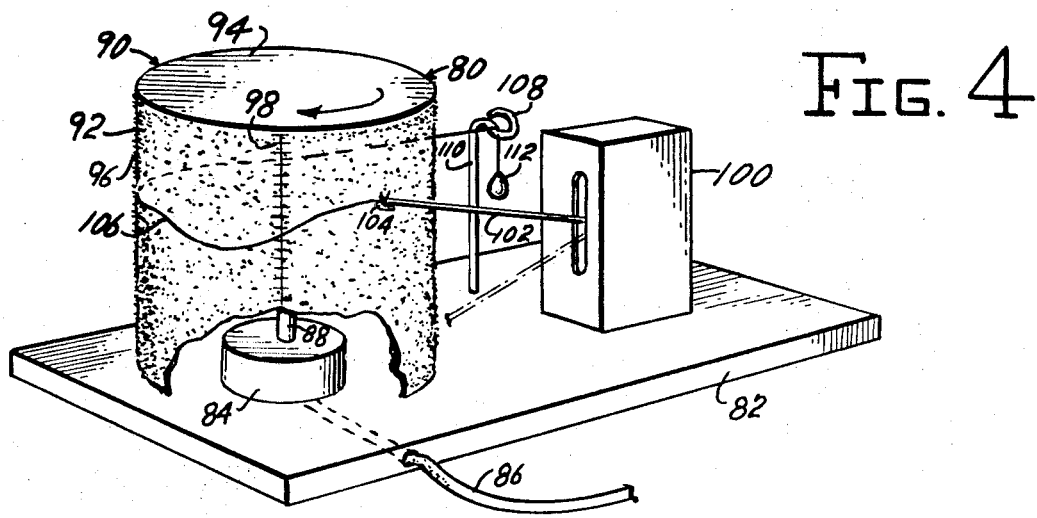
Figure 5:
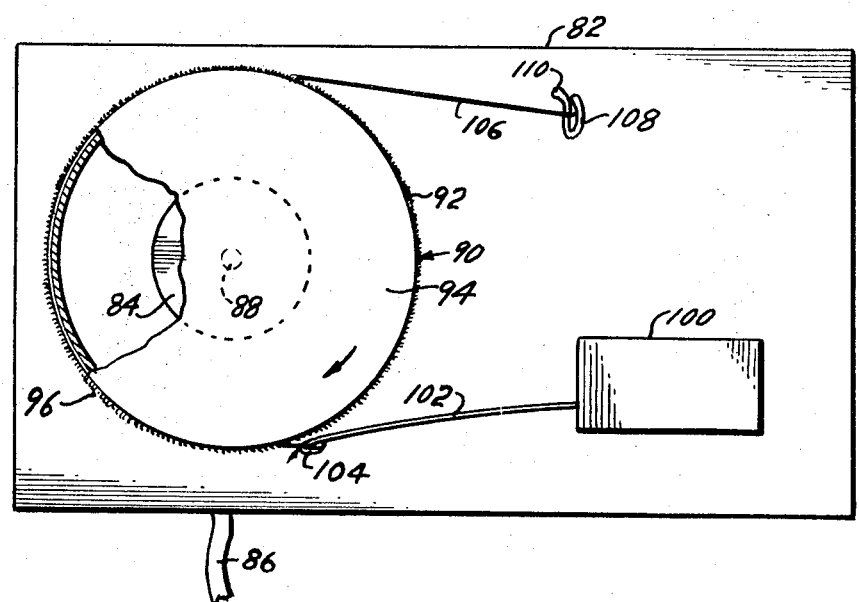

IN THE DRAWINGS:

FIG. 1 is an isometric view looking at a preferred embodiment of the invention constructed in accordance with the specific teachings thereof and illustrates the positioning of a flexible strand on a surface;

FIG. 2, taken on line 2–2 of FIG. 1, is a vertical lateral cross-sectional view of the invention and shown details of construction of the same;

FIG. 3, on an enlarged scale, is a fragmentary cross-sectional view illustrating the placing of the flexible strand on the surface;

FIG. 4 is an isometric view looking at another preferred embodiment of the invention and illustrates the placing of the flexible strand on a vertical surface; and, FIG. 5 is a plan view looking down on the embodiment of the invention of FIG. 4 and illustrates the placing of the flexible strand on a vertical surface.

In FIGS. 1 through 3 there is illustrated an embodiment of the invention and which embodiment shown a cylinder 10. The cylinder 10 has a cylindrical wall 12, has an exterior surface 14. In the cylindrical wall 12 there are a number of aligned passageways 16 and in the passageways 16 there are raised guides 18. The raised guides 18 in a row may join in a common base 20.

The cylinder 10 has ends 22. In each of the ends 22 there is a passageway 24. The passageways 24 are aligned. There is positioned in the passageways 24, a shaft 26.

The cylinder 10 is supported on a base 28. In FIG. 1 it is seen that the base 28 is of a generally rectangular configuration and is flat. Positioned on the base 28 is an upright pedestal 30. The base of the upright pedestal 30 connects with an angle member 32. The angle member 32 has one leg 34 which is bonded to the base 28 and a second leg 36 which is bonded to the upright pedestal 30.

In the upright pedestal 30 there is a passageway 38 and in the passageway 38 there is a bearing 40. The shaft 26 is journaled in the bearing 40.

Also, on the base 28 there is an upright support 42. The upright support 42 has a leg 44 which leg 44 is bonded to the base 28 by means of a rivet or pin 46.

There is positioned on the upper end of upright support 42 a revolving mechanism 48. The revolving mechanism 48 may be the main works of a clock. As is seen in FIG. 2 there is a winding key 50 for winding the revolving mechanism 48. The revolving mechanism 48 connects with the shaft 26 so as to rotate shaft 26.

On the upright pedestal 30 there are indicia 51. The indicia 51 can indicate time in a manner similar to that which time is indicated by a clock. Further, there is a hand 52 on the shaft 26 and near the upright pedestal 30. The hand 52 rotates with the rotation of the shaft 26 in the cylinder 10 so as to indicate, in conjunction with the indicia 51, the time. The upright pedestal 30 may be clear and transparent and of such material as glass or a plasticlike styrene or a plastic such as methyl methacrylate.

In FIG. 1 it is seen that there is mounted on the base 28 a measuring instrument 60. The measuring instrument 60 may a temperature responsive instrument, an atmospheric pressure responsive instrument, such as a barometer, or an instrument responsive to relative humidity. The instrument 60 has an arm 62 which moves across the cylinder 10 so as to move from the revolving mechanism 48 in the direction of the upright pedestal 30 and from the upright pedestal 30 in the direction of the revolving mechanism 48. On the end of the arm 62 there is a hook 64. The hook 64 connects with a flexible strand 66.

The flexible strand 66 may be a string, a chain having small links, a hair, a thread, flexible cable, and the like.

It is seen that the flexible strand 66 is draped over the exterior surface 14 of the cylinder 10 and falls down on the other side of the cylinder as opposed to the side of the cylinder on which there is the arm 62. On the free end of the flexible strand 66 there is attached a weight 68.

On the surface 14 there is indicia 70 to give relative indication of the physical state undergoing measurement, i.e., temperature, atmospheric pressure, or relative humidity.

In use it is seen that the arm 62 takes a position in response to the measuring instrument 60 and likewise, the flexible strand 66 takes a position with respect to the exterior surface 14 of the cylinder 10. With the revolving of the cylinder 10 and the position to the arm 62 and flexible strand 66, there is established a record of a physical state undergoing measurement. The weight 68 on the free end of the flexible strand 66 means that the flexible strand 66 and the surface 14 will part company to leave a fresh surface 14 for receiving the flexible strand 66 at a later date. In this manner the surface 14 is wiped clean or the record erased. The period of time for the cylinder 10 to make one complete revolution depends upon the length of time it is desired to have a record of the physical state undergoing measurement. More particularly, the flexible strand is on approximately one-half the surface 14 of the cylinder 10. If it takes 48 hours for the cylinder 10 to make a complete revolution, then there is 24 hour record of the physical state undergoing measurement. For a person interested in the atmospheric pressure and whether the atmospheric pressure is rising and falling, the 24 hour record is sufficient. However, if a person desires to have a longer record, then the time period for the cylinder 10 to make one complete revolution may be 96 hours. With the flexible strand occupying approximately one-half of the circumference of the cylinder 10, the time period then becomes 48 hours.

The revolving cylinder 10 presents what may be considered to be a horizontal surface to the flexible strand 66. This horizontal surface is continually moving and may be inclined at certain positions but can, nevertheless, be considered a horizontal strip. Further, the cylinder 10 presents an endless surface for receiving the flexible strand 66. Also, it is seen that the raised guides 18 position the flexible strand 66 with respect to the exterior surface 14. In this manner, the flexible strand 66 is definitely positioned so as to present a record to the observer.

In FIGS. 4 and 5 there is illustrated another self-erasing short-time memory data recorder 80. It is seen that there is a base 82. On this base 82 there is mounted a revolving mechanism 84. This particular revolving mechanism is an electric motor and connects with an electric cord 86. The electric motor has an output shaft 88 which projects upwardly. There is mounted on the output shaft 88 a cylinder 90 and which cylinder 90 has an exterior surface 92 and an end 94.

The exterior surface 92 may be a cloth, such as felt which has a number of outwardly directed fibers or hair or positioning devices 96.

On the exterior surface 92 there is indicia 98 for indicating the relative values of the physical state undergoing measurement.

On the base 82 there is mounted a measuring instrument 100. The measuring instrument may be responsive to ambient temperature, atmospheric pressure, relative humidity and the like.

The measuring instrument 100 comprises a movable arm 102. The position of the movable arm is responsive to the physical state undergoing measurement by the measuring instrument 100. The movable arm 102 moves vertically and across the exterior surface 92 of the cylinder 90. On the outer end of the arm 102 there is a hook or eye 104. There is attached to the hook 104 a flexible strand 106. The flexible strand 106 may be a thread, a string, a chain having small links, a hair, a flexible cable, and the like. The flexible strand 106 upon contacting the exterior surface 92, adheres to the exterior surface 92 so as to leave a record of the measurement of the physical state. In FIGS. 4 and 5 it is seen that the flexible strand 106 passes through an angle of approximately 200° to 220° on the exterior surface 92 of the cylinder 90. Then, the free end of the flexible strand 106 passes through an eye 108 on the upper part of the pedestal 110. On the free end of the flexible strand 106 there is a weight 112. The flexible strand 106 passes through the eye 108 and the weight 112 pulls down the flexible strand so as to keep it tight against the exterior surface 92 of the cylinder 90.

The revolving mechanism 84 may be so geared as to turn the cylinder 90 once every 24 hours or 48 hours or as desired. If it be desired to have a record of approximately 12 hours, then the cylinder 90 can be turned or rotated once every 24 hours. If it be desired to have a record of 48 hours, then the cylinder 90 can be rotated once every 96 hours. The flexible strand 106 on the exterior surface 92 assumes a position corresponding to the position of the free end of the arm 102 at the time the flexible strand contacts the exterior surface. With the movement of the arm 102 in a vertical path, the flexible strand 106 is deposited in various elevations on the vertical exterior surface 92.

It is seen that the exterior surface 92 on the cylinder 90 is an endless surface. With the revolving of the cylinder 90, the flexible strand 106 contacts the surface and takes a position on the surface. With the further revolving of the cylinder 90, the flexible strand 106 and cylinder 90 part company so as to automatically erase the record of the flexible strand on the exterior surface. In this manner there is presented to the flexible strand 106 on the free end of the arm 102 a fresh surface for making a new record.

In addition to the use of guides 18 and fibers or hair positioning devices 96, it is possible to use an electrostatic surface for positioning a flexible strand. With the use of an electrostatic surface, the electric charges definitely position the strand onto the surface. The exterior surfaces of the cylinders 10 and 90 may be considered as endless belts so that these surfaces are endless and can present a fresh surface to the flexible strand.

From the foregoing it is seen that I have provided a self-erasing short-time measuring data recorder which automatically erases a record of a physical state. In this manner it is not necessary for the observer to change recording tape or recording paper and to care for a pen or a pencil or a scriber to record on the tape or paper. Actually, with an electric revolving mechanism, the observer need not touch the recorder. All that the observer has to do is observe the record of the flexible strand on the exterior surface. With an atmospheric pressure measuring device, the observer can readily see if the atmospheric pressure is holding steady increasing or decreasing. With the self-wind revolving mechanism, the observer has to wind the mechanism so as to move the exterior surface. However, this is much easier to do than to change paper or tape and the scriber.

I claim:
1. A method for indicating a physical state for a short period of time, said method comprising:
 a. determining said physical state;
 b. moving a flexible indicator of finite length in response to said physical state and with respect to a surface capable of positioning said flexible indicator;
 c. moving said surface and said flexible indicator with respect to each other while said flexible indicator continues to indicate said physical state with respect to said surface; and,
 d. moving said surface to separate said flexible indicator and said surface to eradicate the record of the physical state and to present a fresh surface to the flexible indicator.

2. An indicator responsive to a physical state and which indicator indicates for a short time period said physical state, said indicator comprising:
 a. a flexible strand of finite length;
 b. a surface capable of fixedly positioning said flexible strand;
 c. a measuring instrument responsive to said physical state;
 d. said measuring instrument connecting with said flexible strand;
 e. said measuring instrument through a first means moving said flexible strand with respect to said surface to indicate said physical state;
 f. a second means to move said surface;
 g. said surface and said flexible strand move with respect to each other while said flexible strand continues to indicate said physical state with respect to said surface; and,
 h. said surface upon moving a certain distance separating from said flexible strand.

3. An indicator according to claim 2 and comprising:
 a. said surface being an endless surface; and,
 b. surface upon moving a certain distance separating from said flexible strand to present at a later time a fresh surface to said flexible strand.

4. An indicator according to claim 3 and comprising:
 a. said surface being an upright surface;
 b. a third means to maintain said flexible strand in contact with said surface; and,
 c. indicia juxtapositioned to said flexible strand to indicate the value of said physical state.

5. An indicator according to claim 4 and comprising said measuring instrument being responsive to atmospheric pressure.

6. An indicator according to claim 4 and comprising said measuring instrument being responsive to temperature.

7. An indicator according to claim 4 and comprising said measuring instrument being responsive to relative humidity.

8. An indicator according to claim 3 and comprising:
 a. said surface being a horizontal surface;
 b. a third means to maintain said flexible strand in contact with said surface; and,
 c. indicia juxtapositioned to said flexible strand to indicate the value of said physical state.

9. An indicator according to claim 8 and comprising said measuring instrument being responsive to atmospheric pressure.

10. An indicator according to claim 8 and comprising said measuring instrument being responsive to temperature.

11. An indicator according to claim 8 and comprising said measuring instrument being responsive to relative humidity.